No. 866,645. PATENTED SEPT. 24, 1907.
N. O. HAGEN.
ANTIHUMMER FOR TELEPHONE AND TELEGRAPH LINES.
APPLICATION FILED MAY 4, 1907.
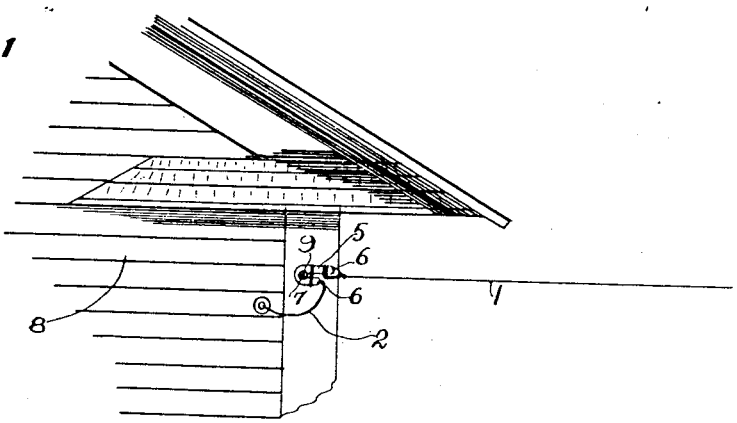
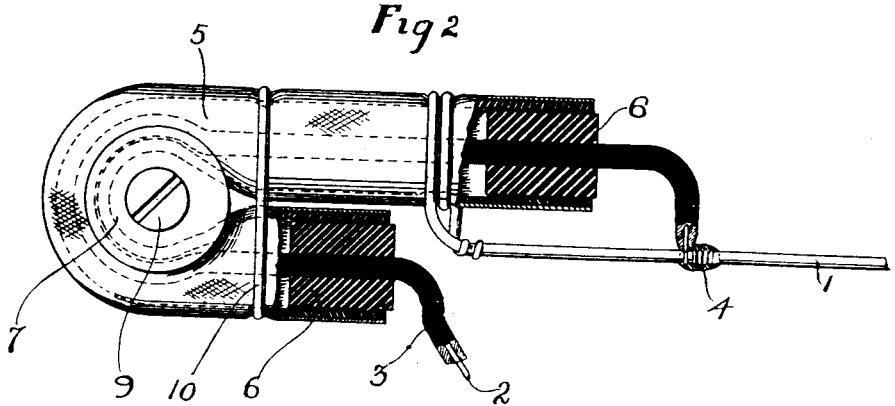
Witnesses:
Leon B. Losey.
H. L. Dittimer
Inventor:
Nels. O. Hagen
By his Attorneys:
Williamson & Merchant

UNITED STATES PATENT OFFICE.

NELS O. HAGEN, OF PEKIN, NORTH DAKOTA, ASSIGNOR OF ONE-HALF TO OLE O. FORDE, OF PEKIN, NORTH DAKOTA.

ANTIHUMMER FOR TELEPHONE AND TELEGRAPH LINES.

No. 866,645.      Specification of Letters Patent.      Patented Sept. 24, 1907.

Application filed May 4, 1907. Serial No. 371,814.

*To all whom it may concern:*

Be it known that I, NELS O. HAGEN, a citizen of the United States, residing at Pekin, in the county of Nelson and State of North Dakota, have invented certain new and useful Improvements in Antihummers for Telephone and Telegraph Lines; and I do hereby declare the following to be a full, clear, and exact description of the invention, such as will enable others skilled in the art to which it appertains to make and use the same.

My invention relates to telephone and telegraph systems and has for its object to provide an improved device for connecting the line wire and the house or station wire and for attaching the same to the building.

It is a well known fact that a great deal of annoyance is caused by the humming produced by the vibration of the line wire of a telephone or telegraph system in windy weather. A wooden building or structure acts in a sense as a sounding board which intensifies rather than diminishes the humming sound set up by these vibrations of the wire.

My invention has for its particular object to provide a device for the attachment of the line or circuit wire to a house or building, and which, at the same time, will act as a muffler and thereby eliminate or greatly reduce the buzzing sound set up by these vibrations of the wires. This improved device I designate as an anti-hummer. The preferred form thereof is illustrated in the accompanying drawings wherein like characters indicate like parts throughout the several views.

Referring to the drawings, Figure 1 is a view in elevation showing a portion of a house and illustrating my improved so-called anti-hummer applied thereto, to support and connect the ends of the line or main circuit wire and the house or station wire; and Fig. 2 is a detail principally in elevation but with part sectioned, showing the improved anti-hummer on a larger scale than Fig. 1.

The line or main wire is indicated by the numeral 1, and the so-called house or station wire is indicated by the numeral 2. The said wire 2 is covered with a heavy insulation 3, and at its outer end is electrically connected to the main wire 1 preferably by being coiled around the same and secured by a body of solder 4. The body of the so-called anti-hummer is preferably made up from a section of rubber hose 5 that is bent into an approximately U-shaped form, and is provided at its ends with plugs 6, preferably of rubber or other insulating material. The insulated wire 2—3 is passed axially through the plugs 6 and through the body tube 5. The end of the line or main wire 1 is tightly coiled around the longer end of the tube 5 and is twisted back upon itself so that it is thereby securely anchored to the said tube 5.

In securing the device to a building, the tube 5 is bent around a headed or peripherally grooved hub 7 that is secured to the building 8 by means of a suitable screw 9. A yoke, preferably formed from a piece of wire 10, is secured around the legs or prongs of the tube 5 quite close to the hub 7, so as to thereby securely anchor the said tube to the said hub. It will thus be seen that the wires are not only insulated from the building by which they are supported, but are separated therefrom by pliable devices that will not transmit the vibrations of the wire to the building, but, on the contrary, act as elastic cushions to such vibrations.

In practice, the device above described has been found highly efficient for the purposes had in view. It is of very small cost, and may be very quickly and easily applied in working position in the manner or substantially the manner illustrated in the drawings.

What I claim is:

1. In a device of the kind described, a pliable tube secured to a support and provided with plugs in its ends, and a conducting wire extended through said tube and through the plugs in the ends thereof, substantially as described.

2. In a device of the kind described, the combination with a pliable tube 5 bent upon itself and secured to a support and provided with plugs 6 in its ends, of a main wire 1 coiled about and secured to one end portion of said tube 5 inward of the adjacent plug 6, and a house or station wire 2 electrically connected to said wire 1 and extended through said tube 5 and through the plugs 6 in the ends thereof, substantially as described.

3. The combination with an anchoring hub 7 adapted to be secured to a support, of a pliable tube 5 bent around said hub, a yoke 10 passed around the prongs of said tube 5 and securing the same to said hub 7, plugs 6 in the ends of said tube 5, a main wire 1 coiled around and secured to one prong of said tube 5 inward of the adjacent plug 6, and a house or station wire 2 electrically connected to said wire 1 and passed through said tube 5 and through the plug 6 thereof, substantially as described.

In testimony whereof I affix my signature in presence of two witnesses.

NELS O. HAGEN.

Witnesses:
   T. J. ALSTAD,
   W. C. FREDRICKSON.